United States Patent [19]

Player et al.

[11] Patent Number: 4,762,725
[45] Date of Patent: Aug. 9, 1988

[54] SHELF STABLE NON-AQUEOUS SPREADABLE COATINGS

[75] Inventors: Kenneth W. Player, Olmsted Falls; Lonny L. Wilson, Brunswick, both of Ohio

[73] Assignee: Durkee Industrial Foods Corp., Cleveland, Ohio

[21] Appl. No.: 880,342

[22] Filed: Jun. 25, 1986

Related U.S. Application Data

[63] Continuation-in-part of Ser. No. 612,976, May 23, 1984, abandoned.

[51] Int. Cl.$^4$ .......................... A23D 5/00; A23G 3/00
[52] U.S. Cl. ................................... 426/582; 426/583; 426/585; 426/601; 426/613; 426/631; 426/653
[58] Field of Search ................. 426/93, 601, 613, 589, 426/632, 572, 583, 585, 631, 653, 582

[56] References Cited

U.S. PATENT DOCUMENTS

| | | | |
|---|---|---|---|
| 2,015,257 | 9/1935 | Clinkner | 426/93 |
| 2,168,360 | 8/1939 | Musher | 426/589 X |
| 2,222,560 | 11/1940 | Clickner | 426/613 X |
| 3,210,198 | 10/1965 | Keller | 426/250 |
| 3,288,378 | 11/1966 | Japiske et al. | 426/633 X |
| 3,766,226 | 10/1973 | Gooding | 260/398.5 |
| 3,903,311 | 9/1975 | Billerbeck et al. | 426/324 |
| 4,152,466 | 5/1979 | Deretchin | 426/613 |
| 4,198,439 | 4/1980 | Hoover | 426/632 |
| 4,296,141 | 10/1981 | de Paolis | 426/613 |
| 4,341,814 | 7/1982 | McCoy | 426/607 |
| 4,396,633 | 8/1983 | Tresser | 426/306 X |

Primary Examiner—Donald E. Czaja
Assistant Examiner—Celine Callahan
Attorney, Agent, or Firm—Richard H. Thomas

[57] ABSTRACT

A non-aqueous, lipid-based, stable, flavored coating having a smooth, non-grainy texture, spreadable at room temperature but capable of form retention when applied to a substrate at a temperature up to about 110° F.; comprising about 10–70% of a hydrogenated vegetable oil having a Wiley Melting Point less than about 90° F.; about 30–90% of a particulate friable, non-hygroscopic bulking agent; about 0 to a flavoring amount of a flavorant; and about 0.1 to about 8% of a lipid stabilizer having a Capillary Melting Point in the range of about 125°–150° F., said vegetable oil and stabilizer defining on cooling a lipid matrix for the bulking agent, said bulking agent being substantially impalpable in the lipid matrix.

9 Claims, No Drawings

SHELF STABLE NON-AQUEOUS SPREADABLE COATINGS

This is a continuation-in-part of co-pending application Ser. No. 612,976 filed on 5/23/84, now abandoned.

The present invention relates to a smooth, uniform-textured, spreadable, savory coating, and particularly to one which is non-aqueous and stable at normal ambient temperatures.

The savory coatings of the present invention may have any of a number of different flavors, including chocolate, cheese, meat, vegetable, fowl or fish. The flavor can be synthetic or natural, such as might be imparted by cocoa powder, peanut powder, or dried cheese powder.

For purposes of the present application, the term "coating" means a layer (on a substrate) which has perceptible thickness, by eye measurement, and also mouth feel, as contrasted with a film. The term includes fillings, such as within an enveloping shell or sandwiched between a pair of substrates.

The term "non-aqueous" means substantially free of water. The coatings of the present invention, preferably, have a maximum moisture content of about $3\frac{1}{2}\%$ by weight.

By "stable" it is meant that the products of the present invention are both oxidative stable and heat stable. By "oxidative stable" it is meant that the products can be stored for prolonged periods of time under normal ambient conditions, for instance from about 70° F. to about 110° F., without refrigeration and without spoiling or degradation of the coating. By "heat stable", it is meant that the products of the present invention are resistant to oil separation under normal ambient conditions.

The term "spreadable" has its ordinary dictionary definition. Under ambient conditions, the coatings of the present invention can be readily spread onto a substrate using a knife, or the like. By "smooth" it is meant that the coatings of the present invention have a non-grainy, uniform, plastic texture similar to butter or peanut butter, wherein solids in the coating are essentially impalpable. This does not preclude the addition of solids such as bacon bits, chive pieces and toasted onion chunks added to impart flavor or bite. In such instances, the coatings of the present invention provide a matrix for the added solids, and the term "smooth" is applicable to the matrix.

BACKGROUND ART

It is well known to produce spreadable products, for instance peanut butter spreads and cheese spreads. A peanut butter spread is fairly unique as spreads go, comprising at least about 90% whole peanuts, the remaining 10% being sweetener, salt and stabilizer. The whole peanuts are about 40-50% peanut oil, the remainder being protein solids. Although peanut butter has a very pleasing taste and texture, the strong flavor of the whole peanuts, in such a dominant amount, by and large prevents the use of this formulation for spreads of a different flavor.

Other food spreads of various types, such as margarine, but also including cheese spreads, are almost universally based on aqueous sytems and require product refrigeration once exposed to the atmosphere.

Prior U.S. Pat. No. 2,222,560 to Clickner describes a cheese-flavored composition which comprises spray dried cheese powder and a fat such as refined coconut oil or hydrogenated coconut, cottonseed, sesame, or corn oil. The composition may comprise 15-20% cheese powder, and is said to be substantially solid at room temperature, having a consistency similar to butter. It is adapted to be applied to popcorn or the like by melting and then pouring or spraying, and would not be suitable for use in a coated product of the type wherein heat stability was required.

Prior U.S. Pat. No. 4,198,439 to Hoover describes a peanut/cheese food product which is said to have a long shelf life at room temperature and which can vary in consistency from a firm cheddar cheese-like texture to a soft spreadable consistency. The product appears to be a marriage of peanut and cheese flavors, and comprises about 50-80% ground roasted nuts, 10-40% dehydrated cheese material, and 5-15% of an ingredient referred to as a texture-modifying agent comprising non-hydrogenated fat in combination with hydrogenated fat, glycerides and mixtures thereof. The texture-modifying agent is stated to have a Capillary Melting Point above 120° F. Varying the ratio of hydrogenated to non-hydrogenated fat is said to alter the texture from firm to soft, without changing the total fat content. There is no teaching in this patent concerning stabilizing an oil solids product.

In the Hoover patent, the product is not an engineered composition. More correctly, it should be characterized as a filled peanut butter. Peanut butter has a standard of identity and must by law comprise about 90% peanuts, of which about 50% is oil and 50% is solids. The additives to the ground peanuts comprises less than 10% of the composition, namely, a sweetener, salt and a stabilizer.

The object in Hoover is to bulk up the composition with a complementary flavor, namely, that provided by cheese powder. Still, basically, it is a filled peanut butter since the peanut butter comprises up to 80% of the composition, typically about 65%-70%. To put it another way, the Hoover composition is essentially 70% peanut butter, with added cheese particles.

To compensate for the reduction of ground peanuts in the composition, and addition of cheese powders, Hoover suggests adding what he refers to as a texture-modifying agent. Hoover then goes a step further and states that the composition can be made thin or stiff by adjusting the ratio of hydrogenated fat to non-hydrogenated fat used in the texture-modifying agent.

This is the context of Hoover; basically, an extension of peanut butter technology.

Clearly, Hoover would be as unsuitable for the present invention as peanut butter itself, in that the composition is locked into not only the characteristics of peanut butter, but also the flavor. In this regard, the ratio of added fat to indigenous fat, from the peanut butter and added cheese powder, is important. In Table 1 of the patent, 64.6% of the composition is ground roasted nuts (50% peanut oil). This provides about 32% fat. The dehydrated cheese, in the amount of 24%, is about 50% butterfat, but only about 75% of the butterfat is released, during processing, for the addition of about 9% fat. This adds up to about 41% indigenous fat. From the ranges given in Table 1, the Hoover composition, using the above mode of calculation, is at least about 28.7% indigenous fat. By contrast, the amount of added texture modifying agent added is in the range of about 5-15% (Table 1).

From the above, it is apparent that the indigenous fat content dominates the characteristics of the composition.

In processing, the lipid ingredients are heated until melted, and the ground roasted nuts are then added, with mixing to a smooth consistency. Also added would be an emulsifier such as lecithin, along with salt, flavorants and colorants. The dehydrated cheese is then blended in at a temperature of 140° F. This is followed by packaging, although it is indicated that the mixture can be passed through a colloid mill or homogenizer prior to packaging.

The product is said to have a water activity rating of less than about 0.7, thereby avoiding the need for refrigerated storage.

Since the patent is directed essentially to a means for combining peanut ingredients and cheese powders, it is clearly limited to products where a peanut/cheese flavor is desired.

DISCLOSURE OF INVENTION

The present invention resides in a non-aqueous, lipid-based, stable, flavored coating having a smooth, non-grainy texture, said coating being spreadable at room temperature but capable of form retention when applied to a substrate at a temperature up to about 110° F.; comprising about 10–70% of a hydrogenated vegetable oil having a Wiley Melting Point less than about 90° F. and a Solids Fat Index at 100° F. of 1 maximum, at 90° F. of 3 maximum, and at 70° F. of 30 maximum; about 30–90% of a particulate friable, non-hygroscopic bulking agent, preferably selected from the group consisting of cocoa powder, dried cheese powder, bland invert sugar, bland dairy-derived protein, bland vegetable protein, bland corn syrup solids, and flavor compatible combinations thereof; about 0 to a flavoring amount of a flavorant; and about 0.1 to about 8% of a lipid stabilizer having a Capillary Melting Point in the range of about 125°–150° F., preferably selected from the group consisting of a hard polyglycerol ester of a fatty acid, a hard mono-diglyceride and stearine; said coating being prepared by mixing the ingredients thereof at a temperature sufficiently elevated to render the lipid components in a molten state, said vegetable oil and stabilizer defining on cooling a lipid matrix for the bulking agent, said bulking agent can substantially impalpable in the lipid matrix.

BEST MODE FOR CARRYING OUT THE INVENTION AND INDUSTRIAL APPLICABILITY

The major lipid component of the present invention is a hydrogenated vegetable oil having a Wiley Melting Point not substantially greater than about 90° F. and an AOM value of at least about 25 hours. The AOM value is determined by a known test referred to as the Accelerated Rancidity Test, the letters AOM standing for Active Oxygen Method. The vegetable oil, preferably, has a Solids Fat Index at 100° F. of 1 maximum, at 90° F. of 3 maximum, and at 70° F. of 30 maximum.

Broadly, the vegetable oil can be any edible oil, or blend of oil and fat, coming within the parameters given, although a non-lauric oil is preferred which has both oxidative and hydrolytic stability. Examples of suitable non-lauric oils are winterized salad oils, hydrogenated soybean oil, hydrogenated cottonseed oil, and a hydrogenated, fractionated palm oil.

A lauric oil such as 76° coconut oil may be used in a blend with a non-lauric oil, and this is broadly within the scope of the present invention. Being a lauric oil, it does not have hydrolytic stability, but since the present system is anhydrous, hydrolytic stability is not critical. Also, 76° F. coconut oil is by itself not suitable, being too brittle at normal room temperature to give a spreadable product. The same is true of refined and hydrogenated palm kernel oil. However, in a blend with a non-lauric oil, both can be used in small amount.

Also, a hard butter such as a fractionated, hydrogenated soybean/cottonseed oil can be used in small amounts as part of the lipid component. As will be described, the oil/stabilizer system of the present invention provides a matrix for the coating, bulking ingredients, and the solids part of the stabilizer generally is the ingredient which rigidifies the lipid system and prevents separation of oil and bulking solids. If a hard butter is used, its solids content can contribute to stabilization, so that less added stabilizer need be used. In this regard, a solid or plastic shortening can also be used in blend with a hydrogenated vegetable oil. The terms fat, hard butter, and plastic shortening are used herein in their common sense to define or refer to normally plastic or hard lipid products. A critical factor is that the oil component of the product of the present invention, whether or not a blend having some hard butter or plastic shortening, should have a maximum solids content at 70° F. of about 30, to provide a spreadable consistency at normal ambient temperatures.

One suitable such oil useful in the practice of the present invention is marketed under the trademark Durkex 500, by SCM Corporation. This oil is a fractionated, hydrogenated, soybean/cottonseed oil mixture having a Wiley Melting Point of about 73° F., an AOM stability of at least about 350 hours, and a free fatty acid content of about 0.05% maximum. The oil has an Iodine Value of about 74–81, is bland in flavor and light in color, having a Lovibond color maximum of about 7.0 Red.

Another suitable low-melting point oil is Durkex 100 (trademark SCM Corporation), a partially hydrogenated soybean oil having a Wiley Melting Point of about 65° F. and an SFI at 50° F. of about 11 maximum. Durkex 100 has an IV of about 85–90 maximum. It has an AOM stability of about 90 hours minimum, and a maximum Lovibond color of about 1.5 R. This product, as with Durkex 500, is bland in flavor.

An example of a winterized salad oil that can be employed is Durkex 25 (trademark, SCM Corporation), a partially hydrogenated soybean oil having an A.O.M. stability of 25 hours, a free fatty acid content of 0.05% maximum, and a color of 2R maximum.

An example of a hydrogenated palm oil fraction suitable in the practice of the present invention is one having a Wiley Melting Point of about 86°–90° F. and an SFI of about 10 minimum at 80° F., 3 maximum at 92° F., and 1 maximum at 100° F. At 70° F., it has an SFI of about 30.

Coconut oil, with a Wiley Melting Point of 73°–79° F., (such as that marketed by SCM Corporation under the trademark Konut) may also be used as a lauric component in blend with a non-lauric oil. This oil has a Lovibond color of 1.5R (maximum) and an AOM value of 100 hours (minimum), and may have special usefulness in spreads suitable for warmer climates.

A suitable plastic shortening that can be used in blend with an oil is Kaola-D shortening (trademark, SCM Corporation), which has a Wiley Melting Point of about 98°–104° F., a bland flavor, an AOM of 150 minimum, and a Solids Fat Index of 43 at 50° F., 24 at 70° F., 15 at 80° F., 7 at 92° F., and 3 at 100° F. This shortening is made from hydrogenated soybean and palm kernel oil. Also useful, is a non-hydrogenated, non-lauric, 40–48 IV mid-fraction of palm oil which has a Mettler Dropping Point of 31±2° C. and a Solids Fat Index of 55 minimum at 50° F., 30 minimum at 70° F., 10 minimum at 80° F., 3 maximum at 92° F., and 1 maximum at 100° F. A hard butter example is Kaomel (trademark, SCM Corporation), a hydrogenated and fractionated soybean/cottonseed oil having a Wiley Melting Point of about 97°–101° F., and an SFI as follows:

| Temperature | Approx. % Solids |
|---|---|
| 50° F. | 69 min. |
| 70° F. | 59 min. |
| 80° F. | 52 min. |
| 92° F. | 22 min. |
| 100° F. | 5 max. |

In the above examples, the Wiley Melting Point was determined by AOCS method Cc-2-38. The approximate SFI was determined by AOCS method Cd-10-57.

The bulking ingredient of the present invention can be ordinary cocoa powder or dry cheese powder. Prior application Ser. No. 402,884, now abandoned, assigned of the present application, contains a detailed description of dried cheese powder ingredients which may be employed. These may be employed alone or as blends, or in combination with cheese flavors (which are cheese powders with other ingredients). These cheese powders are simply dehydrated cheese, usually spray dried powders, and many have a relatively high butterfat and/or vegetable fat content of, for instance, about 20 to about 46%, although, broadly, the cheese powders can vary all the way from about 60% fat down to as little as 0–10% fat. Also within the scope of the present invention are enzyme modified cheese powders. The cheese powders are available in a number of different flavors, for instance, Swiss, Cheddar, aged or unaged, and, perhaps, colored or uncolored. Preferably, the cheese powders are marketed with a moisture content of less than about 10%, preferably less than about 5%. The following Table 1 is a list of representative Swiss and Cheddar cheese powders and flavors that may be employed in the practice of the present invention, either alone or in blends:

The cheese powders and flavors of Table 1 are marketed by Beatrice Foods Co. In addition to the cheese powders of Table 1, the following can be used:

TABLE 2

| Borden Co. #3653 | Cheddar cheese, hydrogenated vegetable oil, buttermilk solids, salt, sodium phosphate, sodium hexametaphosphate, citric acid, lactic acid, and artificial color. |
|---|---|
| Nutritek 250 (Foremost Foods) Borden Zest 13653 | Whole milk cheese whey with 25% of the mineral salts removed. |
| Borden co. #90 | Cheddar cheese, hydrogenated vegetable oil, condensed buttermilk, sodium chloride, disodium phosphate, sodium hexametaphosphate, citric acid, lactic acid, artificial color. |
| Borden Co. #87 | Swiss cheese flavoring powder alternative to Cheztone 700. |
| Land-O-Lakes Dried Proces Cheese #5540 | Spray dried process cheese produced by removing moisture from processed American cheese by spray drying; fat content 46.5%, moisture 4%. |
| Land-O-Lakes #9809 | Spray dried Blue cheese produced by removing the moisture from aged Blue cheese; fat content 41%, moisture 4%. |
| Land-O-Lakes Cheddease 250 | Cheddar cheese in powder form - contains also buttermilk, whey, butter, salt, sodium phosphate, flavoring, MSG, coloring; fat content 25%, moisture 4%. |

The disclosure of Ser. No. 402,884, now abandoned, is incorporated by reference herein.

In addition to the above ingredients, one can employ a bland, friable, non-hygroscopic bulking ingredient such as described in prior application Ser. No. 577,393, filed Feb. 6, 1984, now U.S. Pat. No. 4,562,079, also assigned to assignee of the present application. As disclosed in Ser. No. 577,393, the bulking ingredient should be comprised of inert particles capable of being non-gritty in the lipid phase, either rendered so by conventional confectionary refining techniques or by separate particle size reduction of the bulking ingredient and adding the ground particulates to the lipid phase. For this purpose, a principal requirement of the bulking ingredient is that it be friable, having a friability factor approximately equivalent to that of sugar. Attrition of the bulking particles can be carried out in a number of ways, for instance, in a hammer mill, a ball mill, or a roll mill. It also may be desirable, for optimum control of properties of the finished product, that the bulking particles be substantially free of fat which would function as a diluent of the lipid phase. The bulking particles, as mentioned, preferably, are bland in taste, to avoid mask-

TABLE 1

| CHEESE POWDERS | | | | |
|---|---|---|---|---|
| Trademark | Flavor | Min. Fat Content | Moisture Content Max. | Ingredient Declaration |
| Beatreme 1326 | Aged Cheddar | 46% | 3.5% | Cheddar cheese solids/sodium phosphate |
| Beatreme 1412 | Mild Cheddar | 46% | 3.5% | Manufactured from uncolored non-aged Cheddar cheese. |
| Cheztone 100 | Cheddar | 32% | 4.0% | Cheddar cheese solids, cultured non-fat milk solids, whey solids, hydrogenated shortening, salt, sodium phosphate; |
| Cheztone 101 | Cheddar | 32% | 4.0% | same as Cheztone 100 but with coloring. |
| Beatone 101 | Cheddar (high flavor powder) | 46% | 3.5% | Cheddar cheese solids |
| Beatreme 1923 | Typical Swiss | 39% | 3.5% | Swiss cheese solids/sodium phosphate |
| Beatone 700 | Swiss flavor | 20% | 4.0% | Enzyme modified swiss cheese solids, non-fat mild solids, sodium citrate. |
| Cheztone 700 | Swiss | 20% | 4.0% | Swiss cheese solids, cultured non-fat milk solids, sodium phosphate. | ing or adversely affecting the other flavors which may be added. The particles are preferably non-hygroscopic, equivalent in this regard, as well, to sugar, to avoid water pickup prior to processing. Water can adversely affect processing during refining, and/or conching, causing undesired agglomeration, as is well known in confectionery practice. Those particles which are bland in taste and at the same time have a high degree of friability and non-hygroscopicity approximating that of sugar, are disaccharides, such as lactose or whey. Whey is very high in lactose content. The whey can be demineralized whey or sweet dairy whey. Sweet dairy whey has a slight saltiness, which may be advantageous or disadvantageous, depending upon the dominant flavor desired.

The bulking particles of this invention can also include friable, dairy-derived food additives such as non-fat dry milk and non-fat buttermilk solids, both well known ingredients in confectionery formulations. Another useful ingredient is a protein, one that is bland in flavor, such as defatted soy protein. A friable protein such as a caseinate can also be used. The protein provides nutrition and also a desired astringency. A textured vegetable protein can be used. Another category of ingredients that can be used is a bland, hydrolyzed, non-hygroscopic, friable starch, such as a low DE corn syrup solid, preferably having a dextrose equivalent less than about 15, e.g., maltodextrin.

Many other bulking ingredients will be apparent to those skilled in the art, and many will be developed in the future since this is an area of rapidly developing technology. The present invention is not limited to specific ingredients. It is necessary only that they be bland or complementary in flavor with the dominant flavor desired, that they be friable and non-hygroscopic. By being friable, they resist agglomeration and can be reduced in particle size so that they are substantially impalpable in the coating. For purposes of the present application, the term friable means that the bulking ingredients are capable of a size reduction to not substantially greater than 50 microns average particle size.

The disclosure of Ser. No. 577,393 now U.S. Pat. No. 4,562,079 is incorporated by reference herein.

The bulking component of the present invention can also comprise flavor-compatible combinations of the above ingredients. For instance, with the cocoa powder, one may advantageously employ a dairy-derived bulking ingredient such as non-fat dry milk solids or buttermilk solids, following conventional confectionary practice. In addition, one may employ an amount of an invert sugar such as lactose, or even sucrose or dextrose, depending upon the amount of sweetness desired. Similarly, with the cheese powders, one may wish to employ an amount of a bland bulking ingredient such as non-fat dry milk solids or an invert sugar, preferably bland, such as lactose.

In the case of other savory flavors such as meat, fowl, fish or vegetable, flavorable bulking ingredients such as cheese and cocoa powder may not be desirable or compatible, and in such case the bulking ingredient might be solely a blend of such ingredients as called for in copending application Ser. No. 577,393 now U.S. Pat. No. 4,562,079. In that application, it was described that a combination of bulking ingredients was desirable. Specifically, a preferred bulking agent comprising at least 15% of a bland, dairy-derived, friable carbohydrate such as lactose, whey, or a blend thereof. On a parts basis, the bulking agent preferably comprised about 15-40 parts carbohydrate (either lactose, whey, or a blend thereof); approximately 0-30 parts maltodextrin or other bland, low DE hydrolyzed starch; and approximately 0-30 parts of a defatted soy protein or other friable, bland, non-hygroscopic protein having a high protein content. As was pointed out in the specification for Ser. No. 577,393, the dairy-derived ingredients such as non-fat dry milk solids and non-fat buttermilk solids may have too much flavor for many delicate flavors, such as a meat, fish or vegetable flavor. However, it is within the scope of the present invention that these materials can be included in small amounts. The protein component is advantageous in that it provides nutrition and also a desired astringency advantageous with such flavors as meat, fish or fowl. Carbohydrates such as lactose or whey have a slight milky flavor, and soy protein a slight beany flavor, so that a desirable ingredient of the base, to dilute the flavors of these ingredients, is a bland, hydrolyzed, non-hygroscopic, friable starch such as a low DE corn syrup solid having a dextrose equivalent less than about 15, e.g., maltodextrin.

Preferably, the bulking ingredient(s) of the present invention contains a maximum of about 50% fat (as indicated above, some cheese powders useful in the present invention contain about 46% indigenous fat, such as butterfat), only about 70-75% of which is releasable under the conditions of processing. This excludes peanut butter as a useful bulking agent for the most part, since peanut butter is 50% peanut flour and 50% peanut oil, all of which is releasable under conditions of processing.

In this respect, the bulking ingredient(s) is selected, in kind and amount, to contribute released fat or oil to the composition of the present invention, in an amount less than about 25% by weight, basis total composition, more preferably about 5-15%, as will be described.

Broadly, the stabilizer component of the present invention is any high melting point, edible lipid having a Capillary Melting Point in the range of about 125°-150° F. The function of the stabilizer is to go quickly to a stable crystal form on cooling from a molten state during preparation of the coatings of the present invention, and to form a stable crystal matrix effective to trap the oil component before it has a chance to separate from the solids or bulking ingredient or ingredients of the coating. Also at the temperature of application to a substrate, which, by way of example, may be about 110° F., the amount of crystal solids matrix provided by the stabilizer is critical to prevent oil separation.

Examples of high melting point lipids suitable to function as a stabilizer are high melting point emulsifiers and stearines. Specific examples of suitable emulsifiers are certain polyglycerol esters of fatty acids, mono-diglycerides, and derivatives of mono-diglycerides such as succinylated or ethoxylated mono-diglycerides.

A preferred stabilizer is Santone 3-1-S (trademark, SCM Corporation), which is triglycerol monostearate (a polyglycerol ester) having a Capillary Melting Point of about 127° F.-131° F. This emulsifier is lipophilic, having an HLB of about 7.2. The emulsifier need not be lipophilic. Santone 8-1-S (trademark, SCM Corporation) which is octaglycerol monostearate, has a Capillary Melting Point of about 131°-137° F., and can be successfully used. This compound has an HLB value of about 13 and is hydrophilic.

A suitable mono-diglyceride emulsifier is Dur-em 127 (trademark, SCM Corporation). This compound has a monoglyceride content of about 40% minimum, an IV of 5 max., and a Capillary Melting Point of about 136°-143° F. The compound is marketed as a peanut butter stabilizer. A blend of mono-diglycerides and sodium stearoyl lactylate, marketed by SCM Corporation under the trademark CW-6, which has a Capillary Melting Point of 130°-140° F., would also be functional. Also, a mixture of mono-diglycerides and ethoxylated mono-diglycerides having a melting point of about 125°-130° F. would be functional.

The stabilizer as mentioned can also be a stearine, which is the high melting point distillation residue from the fractionation of an oil such as cottonseed oil, palm oil or soybean oil. One suitable stearine marketed by SCM Corporation is Durkee 27 (trademark) a partially hydrogenated palm oil stearine having a Capillary Melting Point of about 136°-148° F. This compound has an IV of 5 max. and a free fatty acid content of 10% max. It also is marketed as a peanut butter stabilizer. Palm stearine is preferred as it goes quickly from a molten condition into its stable crystal form when cooled, due to the presence of a large amount of palmitic acid.

The amount of stabilizer required can vary anywhere between about 0.1% to about 8% (based on the weight of the entire composition) and is dependent upon the respective Wiley Melting Points of the oil base employed and the stabilizing agent. The higher the melting point of the stabilizer, the more solids that will be provided by it, and the less the amount of the stabilizer that will be required. For instance, with a composition containing Durkex 500 as the oil base, the amount of stabilizer necessary, with the use of a high melting point stearine, such as Durkee 27, or emulsifier such as Santone 3-1-S, may be as little as about 2%. If a hard butter is used in blend with the liquid oil, such as in a blend of 80% Durkex 500 and 20% Kaomel, as little as 0.1% stabilizer may be necessary. If the base oil is a salad oil, such as Durkex 25, and no hard butter or plastic shortening is used, the amount of stabilizer needed may be as high as about 7%.

The amount of stabilizer required is also dependent on the relative proportions of oil base and bulking agent, a larger amount of oil requiring a proportionately larger amount of stabilizer. The above proportions (amounts of stabilizer) were typical for a composition having about equal proportions of oil base and bulking agent, e.g., cheese powder, carbohydrate, cocoa powder and the like Another factor, also, is particle size. The smaller the particle size, the less likely there is for oil separation. A coarse particle size for the bulking agent may require more stabilizer.

In this regard, broadly, the amount of matrix forming added oil employed is about 10-70% based on the weight of the entire composition, and the amount of bulking agent employed, broadly, is about 30-90%. Within the above ranges, the specific amount of added oil used is a matrix forming amount, dependent upon the melting point of the oil, amount and particle size of the bulking agent, amount of stabilizer, and available fat in the bulking agents employed. Most cheese powders have fat, about 70-75% of which is released under the conditions of processing of the instant coatings. Whole milk powders and buttermilk powders also contain releasable fat. For instance in the following Example 1, Beatreme 1326 (a cheese powder) with about 46% fat, when used in an amount of about 32%, basis whole composition, provides flavor, and, under conditions of processing, releases about 10% fat (again, basis whole composition). This is calculated as follows: $0.75 \times 0.46 \times 0.32 = 0.10$. The skim milk solids and non-fat buttermilk solids are essentially fat free. In this example, only about 30-35% added oil need be used. If the bulking agent is entirely fat free, using defatted powders, the amount of added oil can be as high as 70%. This may be necessary since some oil can be absorbed by the powders, making the oil absorbed unavailable as a contributor to viscosity. At the opposite end of the range, with powders having a large amount of releasable fat, the amount of added oil need be only 10%. Preferably, powders or bulking agents are used, in kind and amount, which contribute less than about 25% fat, preferably about 5 to 15% fat to the composition, so that the added oil required is only in the range of about 10-40%, preferably 25-40% of the composition, more preferably about 30-35%.

The specific limits depend upon the viscosity desired. The coatings of the present invention require stand-up or form retention in addition to being spreadable, at both application and ambient temperatures. Thus, the amount of bulking agent required (which is approximately total composition minus oil) can be said to be a form-retention amount at one end of the scale. At the opposite end, the amount of oil is a film-forming or binding amount; more specifically, it has to be that amount needed to make a viscous product, to provide viscosity, or that necessary to take a viscosity reading.

Some of the emulsifiers useful as stabilizers also function as aerating agents, and aeration may be desired. For instance, in a blend comprising lipids in the ratio of about 85:15:3-4, Durkex 500, Kaomel, and Santone 3-1-S, respectively, the amount of stabilizer (3-4 parts) is in excess of that needed for stabilization and some aeration will occur with high-speed mixing.

The following Examples are illustrative of the present invention.

EXAMPLE 1

The following formulation was employed:

| Ingredient | Parts (%) |
| --- | --- |
| Beatreme 1326 | 31.8 |
| Durkex 500 | 34.1 |
| Santone 3-1-S | 3.0 |
| Skim milk solids | 10.3 |
| Dry non-fat buttermilk solids | 10.3 |
| Lactose | 10.4 |
| | 99.9 |

The ratio of oil base to stabilizer was about 92:8.

The lipid and bulking ingredients were separately mixed, the former in a kettle at about 150° F. The latter were pulverized to less than 50 microns average particle size at about 70° F., using a conventional roll mill. A mixer maintained at about 150° F. was provided for bringing the two ingredients together and providing a homogeneous mix.

Following mixing, the composition was screened to remove agglomerated particles, with recycle of the same back to the mixer, and then portions were passed through a heat exchanger to reduce temperature in the range of about 70°-110° F. Some portions were extruded onto a cracker substrate and some were simply deposited by a nonextrusion method, all to a thickness of about ¼ inches, plus or minus. In all instances, the product, on cooling, had a smooth, homogeneous, but spreadable consistency, a soft non-gritty cheese texture and a clear cheese flavor. All products were both heat and oxidative stable.

As an alternative to immediate application to a substrate, the compositions can be deposited in a package at 70°–110° F., and then later removed from the package and applied to a substrate. An example would be where the compositions were marketed as a dip.

The specific application temperature used depends upon type of end use application. It is well known fat technology that a higher application temperature, e.g., 110° F., allows more crystal growth, giving a firmer product. A ·lower application temperature gives less crystal growth and a more fluid product.

The heat exchanger used in this Example was a swept wall heat exchanger known as a votator. In such a heat exchanger the exit temperature is readily controlled to a temperature in the range of about 70°–110° F. Control of the cooling rate gives controlled crystallization. Again, if a more fluid product is desired, an exit temperature of about 70° F. is established. This means that the cooling rate will be greater for a given through-put, resulting in a smaller crystal size. Conversely, if a firmer product is desired, a higher exit temperature up to 110° F. is established. This gives a lower cooling rate for the established through-put, and a larger crystal size.

As the consistency of the end product is important, cooling at a controlled cooling rate designed to control crystal growth is a preferred method of procedure in the practice of the present invention.

The composition of this Example is most useful as a filling between farinaceous substrates, or as a center filling in co-extruded snacks, e.g., a filled, cooked tube, such as described in "Confectionary Production", September, 1985, pages 492, 494.

Center fillings are known. However, these have mostly been peanut butter fillings, cheese-based fillings, or filled-peanut butter compositions such as disclosed in the Hoover patent (supra). The latter are peanut butter based. Filled compositions are those where a major portion of the product is a natural substance, such as cheese or peanut butter. The problem is that with "filled" compositions one is locked into the flavor texture and other characteristics of the so-called natural ingredient, and flexibility in properties is not possible. For instance, in the case of flavors, the presentation of bland flavors such as fish, tomato and fowl flavor would not be possible. When the composition is cheese based, it contains a large amount of water, and the composition would not be a shelf stable filling as called for in the present application.

In this Example, other flavors than cheese can be provided simply by replacing the Beatreme 1326 with a blank bulking ingredient and addition of the desired flavors. Regardless of the flavor, the composition of the present invention can be regarded as completely shelf stable.

Other advantages of the present invention should be apparent. As previously indicated, the essence of the present invention resides in the discovery that a spreadable filling can be made using an oil rather than a shortening by stabilizing the oil with a high melting point lipid. In the manufacture of spreadable fillings, suitable for all flavors, one might instinctively tend to use a spreadable fat such as a plastic shortening. However, the problem with this approach is that one would be locked into the characteristics of the shortening. If the shortening were relatively stiff, then the filling would taste greasy at room temperature. If the shortening is relatively soft, then it would be soupy and too fluid at higher temperature, for instance, about 95°+ on a hot day.

It is a characteristic of the present invention that the product maintains essentially the same stiffness over a wide temperature range, for instance, from normal room temperature of about 75° F. to a hot day temperature of about 95°–105° F.

In addition, the composition of the present invention offers special advantages over a shortening based composition in the preparation of filled, cooked tubes referred to above. In the co-extrusion process, the filling is injected into the grain-based collet. The collet has to have an exit moisture content of at least 5–6% for the extrusion to take place. This therefore requires drying the collet following extrusion to a moisture content of about 0–3% to achieve shelf life.

During drying, the filling reaches a temperature of about 150°–160° F., at which temperature the lipids in the filling are molten. The presence of the bulking agent solids gives the composition sufficient firmness, despite the molten condition of the lipids, to prevent the composition from flowing out of the collet. However, the cooling takes place at a relatively slow rate since, with a co-extruded product, there is no way to expose the filling to heat exchanger cooling.

In the case of the present composition, this does not create a problem. The longer it takes to crystallize the lipids, in an oil/solids composition, the more likely oiling-off is to occur. The presence of the stabilizing lipid, of relatively high melt point in the present invention, causes the crystal matrix of the composition to reestablish quickly, and no oiling-off takes place.

However, with the use of shortenings, as the fill composition base, in the preparation of co-extruded products, the recrystallization is relatively slow and oiling-off does occur. With oiling-off, the grain-based collets tend to become soggy. In addition, agglomeration of the bulking solids seems to occur. Both results are obviously undesirable.

EXAMPLE 2

In this Example, a blend of cheese powders and flavors were used to provide a cheese/jalapeno product. The following formulation was employed:

| Ingredient | Parts (%) | |
|---|---|---|
| 1. Cheese powders | 32.3 | |
| Parmesan M-163 (Land O'Lakes) | | 24.8 |
| Sour Cream 36 (Mid America) | | 5.0 |
| Blue cheese (Land O'Lakes) | | 2.5 |
| 2. Lipids | 40.0 | |
| Durkex 500 | | 37.0 |
| Santone 3-1-S | | 3.0 |
| 3. Bulking agents | 25.95 | |
| Lactose | | 7.04 |
| Maltodextrin M-040 (Grain Processing) | | 7.04 |
| Buttermilk solids | | 5.00 |
| Non-fat dry milk | | 5.00 |
| Dextrose | | 1.87 |
| 4. Flavorants including Jalapeno powder (.20%) | | 1.75 |

The ingredients were blended, mixed and applied to a substrate as in Example 1, and as in Example 1, gave a homogeneous product which was smooth in consistency, non-gritty, slightly chewy as in a soft cheese, spreadable, and both heat and oxidative stable.

EXAMPLES 3-7

These Examples illustrate the concept of the present invention with different lipid systems. The cheese powders and bulking agents were those used in Example 1, and the procedures employed were also the same as in Example 1.

LEGEND: OIL SYSTEMS

Example 3—Durex 25—Winterized oil
Example 4—Durex 100—65° Max. WMP
Example 5—Durex 500—73° Max. WMP
Example 6—Durex 100/Durex 500—70° Max. WMP

| STABILIZER/AERATING AGENT - SANTONE 3-1-S | | | | |
|---|---|---|---|---|
| Examples | % Oil | % Stabilizer | % Spray Dried Cheese Powders | Bulking Agents(%) |
| 3 | 37.0 | 4.0 | 32.0 | 27.0 |
| 4 | 37.0 | 3.0 | 32.0 | 28.0 |
| 5 | 37.0 | 2.5 | 32.0 | 28.5 |
| 6 | 37.0 | 2.8 | 32.0 | 28.2 |

In all instances, the results obtained were essentially the same as in Example 1. It can be noted that the amount of stabilizer required was higher (4%) with the use of a winterized salad oil than with the use of Durex 500, a somewhat higher melting point oil (2.5%).

The products of the present invention all exhibited good mouthfeel and flavor release, with a quick melt-a-way providing a pleasing cooling sensation without a waxy residue. On a substrate, and after prolonged storage at ambient temperatures, they showed no oil separation, or moisture or oxygen degradation. Examples of uses found suitable for the compositions were as snack spreads, dips, sandwich and cracker cremes, extrudable confectionary centers, anhydrous icings, granola binders and soft truffles.

In the practice of the present invention, alternative procedures for preparation of the coatings and application to a substrate are available.

One example would be to blend all of the ingredients, including lipids, stabilizer, cheese powders, bulking agents and flavor systems, in a ribbon blender at an elevated temperature of about 100° F., subject them to milling in a ball mill or the like at about 150° F., and then screen the milled product with recycle of large particles back to the ball mill, followed by application to a substrate or packaging at 70°-110° F. A heat exchanger would reduce the product temperature after milling and screening to the temperature range desired for coating or packaging.

An advantage of this procedure is that the product of the present invention can be made in as few as three steps; in essence, ribbon blending, ball milling and extrusion or the like, thereby substantially reducing the cost of manufacture. The ingredients or components of the present invention lend themselves well to this alternative procedure.

A further alternative would be to use conventional confectionary practices. By way of example, the bulking agents, which may include cheese powders, and flavor systems, would be first blended together in a ribbon blender. A part of the oil and stabilizer would also be added to the ribbon blender, and the blend would be roll refined in a three or five roll refiner. The product of the refiner could either be subjected to simple mixing at about 150° F. or conching at 150° F., with addition of the balance of the oil and stabilizer to the concher or mixer, whichever is chosen. This product would then be passed through a heat exchanger to reduce temperature and then extruded or packaged at about 70°-110° F., as in the above examples. This procedure may be useful with certain types of spreadable coatings.

We claim:

1. A non-aqueous, lipid-based, stable, flavored filling which is spreadable at normal room temperature but capable of form retention when applied to a substrate at a temperature up to about 110° F., comprising, in proportions based upon the weight of the filling;

about 10-70% of a vegetable oil having an AOM stability of at least about 25 hours, a Wiley Melting Point less than about 90° F. and a Solids Fat Index at 100° F. of 1 maximum, at 90° F. of 3 maximum, and at 70° F. of 30 maximum;

about 30-90% of a non-peanut butter derived, particulate, friable, non-hygroscopic, bulking agent selected from the group consisting of cocoa powder, dried cheese powder, mono- and disaccharides, bland dairy-derived protein, bland vegetable protein, bland hydrolyzed corn syrup solids, and flavor compatible combinations thereof, the bulking agent containing up to about 50 weight percent fat, of which up to about 75% is releasable under the conditions of processing, the amount released being about 5-15% based on the weight of the total composition;

zero to a flavoring amount of a flavorant;

about 0.1 to about 8% of a stabilizing lipid having a Capillary Melting Point in the range of about 125°-150° F.;

said filling being prepared by mixing the ingredients thereof at a temperature sufficiently elevated to render the lipid components in a molten state forming a mixture of ingredients, and cooling said mixture of ingredients from said elevated temperature in a heat exchanger at a controlled rate to a temperature in the range of about 70°-100° F., said vegetable oil and stabilizing lipid defining on cooling a lipid matrix for the bulking agent, said bulking agent being substantially impalpable in the lipid matrix.

2. The filling of claim 1 wherein said bulking agent is friable and has a particle size not substantially greater than 50 microns average particle size.

3. The filling of claims 1 or 2 wherein said stabilizing lipid is selected from the group consisting of normally solid emulsifiers and stearines.

4. The filling of claim 3 wherein said stabilizing lipid is triglycerol monostearate.

5. The filling of claim 3 wherein said stabilizing lipid is a hard mono-diglyceride or derivative thereof.

6. The filling of claims 1 or 2 wherein said vegetable oil is a blend comprising a hydrogenated liquid vegetable oil and hydrogenated plastic or hard fat.

7. The filling of claims 1 or 2 wherein said vegetable oil is a salad oil.

8. The filling of claim 1 wherein said vegetable oil is about 25-40% of the filling.

9. A non-aqueous, lipid-based, stable, flavored filling which is spreadable at normal room temperature but capable of form retention when applied to a substrate at a temperature up to about 110° F., comprising, in proportions based upon the weight of the filling;

about 10–70% of a vegetable oil having an AOM stability of at least about 25 hours, a Wiley Melting Point less than about 90° F. and a Solids Fat Index at 100° F. of 1 maximum, at 90° F. of 3 maximum, and at 70° F. of 30 maximum;

about 30–90% of a non-peanut butter derived, particulate, friable, non-hygroscopic, bulking agent, the bulking agent being selected from the group consisting of cocoa powder, dried cheese powder, mono- and disaccharides, bland dairy-derived protein, bland vegetable protein, bland hydrolyzed corn syrup solids, and flavor compatible combinations thereof and containing up to about 50 weight percent fat, of which up to about 75% is releasable under the conditions of processing, the amount released being about 5–15% based on the weight of the total composition;

zero to a flavoring amount of a flavorant;

about 0.1 to about 8% of a stabilizing lipid having a Capillary Melting Point in the range of about 125°–150° F.;

said filling being prepared by mixing the ingredients thereof at a temperature sufficiently elevated to render the lipid components in a molten state and form a mixture of ingredients and then cooling said mixture of ingredients, said vegetable oil and stabilizing lipid defining on cooling a lipid matrix for the bulking agent, said bulking agent being substantially impalpable in the lipid matrix.

* * * * *